(12) United States Patent
Oqab et al.

(10) Patent No.: US 11,975,398 B2
(45) Date of Patent: May 7, 2024

(54) INDUCTION-BASED SYSTEMS AND METHODS FOR JOINING SUBSTRATES

(71) Applicant: OQAB DIETRICH INDUCTION INC., Kitchener (CA)

(72) Inventors: Haroon B. Oqab, Hamilton (CA); George B. Dietrich, Kitchener (CA)

(73) Assignee: Oqab Dietrich Induction Inc., Kitchener (CA)

( * ) Notice: Subject to any disclaimer, the term of this patent is extended or adjusted under 35 U.S.C. 154(b) by 0 days.

(21) Appl. No.: 17/415,522

(22) PCT Filed: Dec. 19, 2019

(86) PCT No.: PCT/IB2019/061135
§ 371 (c)(1),
(2) Date: Jun. 17, 2021

(87) PCT Pub. No.: WO2020/128976
PCT Pub. Date: Jun. 25, 2020

(65) Prior Publication Data
US 2022/0048126 A1    Feb. 17, 2022

Related U.S. Application Data

(60) Provisional application No. 62/781,920, filed on Dec. 19, 2018.

(51) Int. Cl.
*B23K 1/002* (2006.01)
*B23K 3/047* (2006.01)

(52) U.S. Cl.
CPC ............ *B23K 1/002* (2013.01); *B23K 3/0475* (2013.01)

(58) Field of Classification Search
CPC ........ B23K 1/002; B23K 1/00; B23K 1/0016; B23K 13/01; B23K 2101/40;
(Continued)

(56) References Cited

U.S. PATENT DOCUMENTS 4,420,352 A * 12/1983 Schroeder .............. H05B 6/105
156/499
5,313,034 A * 5/1994 Grimm ............... B29C 66/8362
219/777
(Continued)

FOREIGN PATENT DOCUMENTS

| CN | 106938362 A | 7/2017 |
| CN | 107824953 A | 3/2018 |
| WO | WO-2017121629 A1 | 7/2017 |

OTHER PUBLICATIONS

ISA/CA, International Search Report and Written Opinion, dated Apr. 9, 2020 re PCT International Patent Application No. PCT/IB2019/061135.

*Primary Examiner* — Vy T Nguyen
(74) *Attorney, Agent, or Firm* — Own Innovation; James W. Hinton

(57) ABSTRACT

An example method of joining a first substrate with a second substrate includes applying a filler material between respective portions of the first substrate and the second substrate, the filler material including an electrically conducting and/or magnetic material, wherein the filler material and the respective portions define a joint; applying an alternating magnetic field to the joint to heat the electrically conducting material to a reaction temperature; in response to heating the electrically conducting material to the reaction temperature, energizing the joint using energy released from the electrically conducting material; cooling the joint to join the first substrate with the second substrate.

16 Claims, 6 Drawing Sheets

(58) Field of Classification Search
CPC ............ B23K 2101/42; B23K 2103/18; B23K
3/0475; B23K 1/005; B23K 1/008; B23K
1/203; B23K 11/0066; B23K 11/04;
B23K 11/20; B23K 13/00; B23K 13/015;
B23K 13/02; B23K 13/04; B23K 13/06;
B23K 20/02; B23K 20/023; B23K 20/12;
B23K 20/129; B23K 20/16; B23K
20/227; B23K 2101/18; B23K 2103/04;
B23K 2103/06; B23K 2103/08; B23K
2103/10; B23K 2103/12; B23K 2103/166;
B23K 2103/172; B23K 2103/26; B23K
2103/52; B23K 2103/54; B23K 2103/56;
B23K 28/00; B23K 3/087; B23K 35/001;
B23K 35/02; B23K 35/0244; B23K
35/025; B23K 35/0288; H05B 6/105;
H05B 6/12; H05B 2213/06; H05B 6/02;
H05B 6/06; H05B 6/104; H05B 6/1209;
H05B 2203/013; H05B 2203/017; H05B
2206/023; H05B 2213/05; H05B 2214/04;
H05B 3/34; H05B 3/845; H05B 6/04;
H05B 6/10; H05B 6/108; H05B 6/14;
H05B 6/24; H05B 6/36; H05B 6/362;
H05B 6/365
USPC ....... 219/634, 633, 635, 621, 650, 672, 639,
219/665, 670, 616, 653, 656, 162, 201,
219/438, 553, 605, 617, 626, 645, 651,
219/659, 660, 662, 664, 666, 674, 679,
219/759, 765, 777, 85.1, 85.12, 85.16,
219/85.17, 85.18, 85.2, 85.21; 156/272.4,
156/272.2, 275.7, 275.5, 304.3, 304.6,
156/309.6, 309.9, 499, 91, 108, 113, 122,
156/158, 180, 244.12, 244.13, 244.18,
156/246, 272.8, 273.3, 273.7, 273.9,
156/274.2, 274.6, 280, 293, 303.1, 306.6,
156/308.4, 313, 320, 322, 330, 331.7,
156/345.54, 379.8, 380.2, 380.9, 384,
156/580, 69, 714, 73.1, 73.6, 763, 79, 81,
156/89.27, 89.28, 92, 927; 228/179.1,
228/111.5, 112.1, 157, 180.1, 248.1,
228/262.31, 262.42, 262.51, 262.61,
228/262.72, 262.9, 56.3, 8; 403/179.1,
403/111.5, 112.1, 157, 180.1, 248.1,
403/262.31, 262.42, 262.51, 262.61,
403/262.72, 262.9, 56.3, 8; 29/403.3,
29/403.4, 426.4, 426.5, 602.1, 9;
264/150, 171.12, 171.24, 171.26, 172.1,
264/211.12, 248, 265, 279, 299, 40.1,
264/434, 472, 487; 438/120, 455, 622,
438/629, 65, 672

See application file for complete search history.

(56) References Cited

U.S. PATENT DOCUMENTS

| | | | |
|---|---|---|---|
| 5,509,815 A | | 4/1996 | Jin et al. |
| 5,710,414 A | * | 1/1998 | Matsen ................ B21D 26/025 |
| | | | 219/645 |
| 8,609,532 B2 | * | 12/2013 | Swaminathan ... H01L 21/76877 |
| | | | 438/622 |
| 8,963,057 B2 | | 2/2015 | Gramoll et al. |
| 10,058,950 B1 | | 8/2018 | Gerken et al. |
| 2007/0023486 A1 | * | 2/2007 | Matsuura ............. H05K 3/3494 |
| | | | 228/8 |
| 2011/0280650 A1 | * | 11/2011 | Schmitt ................. B29C 66/112 |
| | | | 264/279 |
| 2016/0151854 A1 | * | 6/2016 | Zhai ....................... B23K 20/02 |
| | | | 228/248.1 |
| 2017/0203377 A1 | | 7/2017 | Yokoyama et al. |
| 2017/0298470 A1 | | 10/2017 | Zeniya et al. |

\* cited by examiner

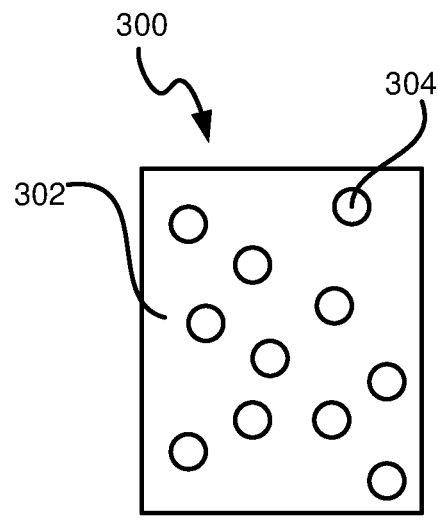
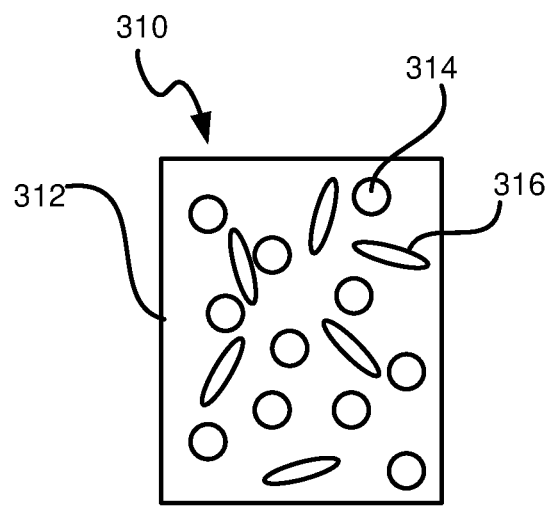
FIG. 3A
FIG. 3B
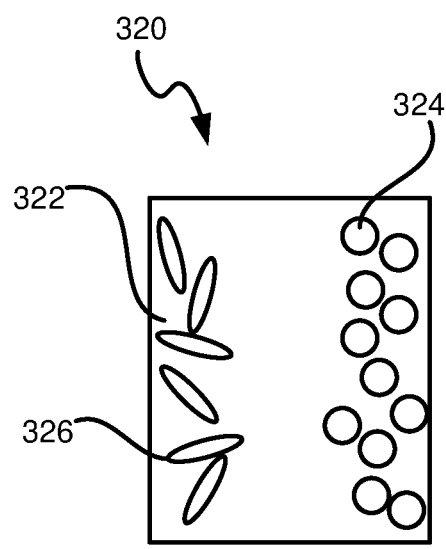
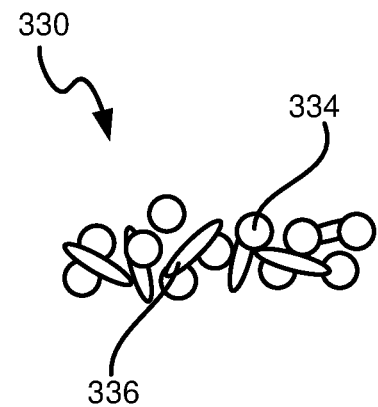
FIG. 3C
FIG. 3D

INDUCTION-BASED SYSTEMS AND METHODS FOR JOINING SUBSTRATES

FIELD

The specification relates generally to systems for joining two substrates together, and more particularly to induction-based systems and methods for joining substrates together.

BACKGROUND

Welding is a fabrication process that joins materials together, including metals, plastics, and other materials. Welding involves using heat or pressure or both to melt parts of the materials and allowing the melted parts to fuse together upon cooling. The heat used in a welding process may be generated by a heat source such as a gas flame, an electric arc, a laser, an electron beam, or ultrasound. Welding often has high temperature requirements to melt the base materials and the heating method may therefore be inefficient.

SUMMARY

According to an aspect of the present specification, a method of joining a first substrate with a second substrate is provided. The method includes: applying a filler material between respective portions of the first substrate and the second substrate, the filler material including an electrically conducting and/or magnetic material, wherein the filler material and the respective portions define a joint; applying an alternating magnetic field to the joint to heat the electrically conducting material to a reaction temperature; in response to heating the electrically conducting material to the reaction temperature, energizing the joint using energy released from the electrically conducting material; cooling the joint to join the first substrate with the second substrate.

According to another aspect of the present specification, an induction-based apparatus to join substrates is provided. The apparatus includes: a housing; an inlet to receive a filler material including an electrically conducting material; an induction heating assembly housed in the housing configured to: receive the filler material from the inlet; and apply an alternating magnetic field to inductively energize the electrically conducting material of the filler material; and a nozzle to expel the energized filler material for joining the two substrates.

BRIEF DESCRIPTION OF DRAWINGS

Implementations are described with reference to the following figures, in which:

FIGS. 3A-3D depict example filler materials for use in the system of FIG. 1;

DETAILED DESCRIPTION

The present disclosure describes induction-based systems and methods for joining two substrates together. A filler material includes an electrically conducting and/or magnetic material and is applied between respective portions of a first and second substrate. Together, the respective portions and the filler material define a joint of the two substrates. The electrically conducting and/or magnetic material is heated to a reaction temperature via induction. In response to heating the electrically conducting and/or magnetic material to the reaction temperature, the joint is energized using energy released from the electrically conducting and/or magnetic material. Upon cooling, the two substrates are joined together. The filler material, and in particular, the electrically conducting and/or magnetic material may be specifically selected based on its heating properties (e.g., reaction temperature, energy release profile, and the like) to allow thermal control of the joining operation.

Figure 1:
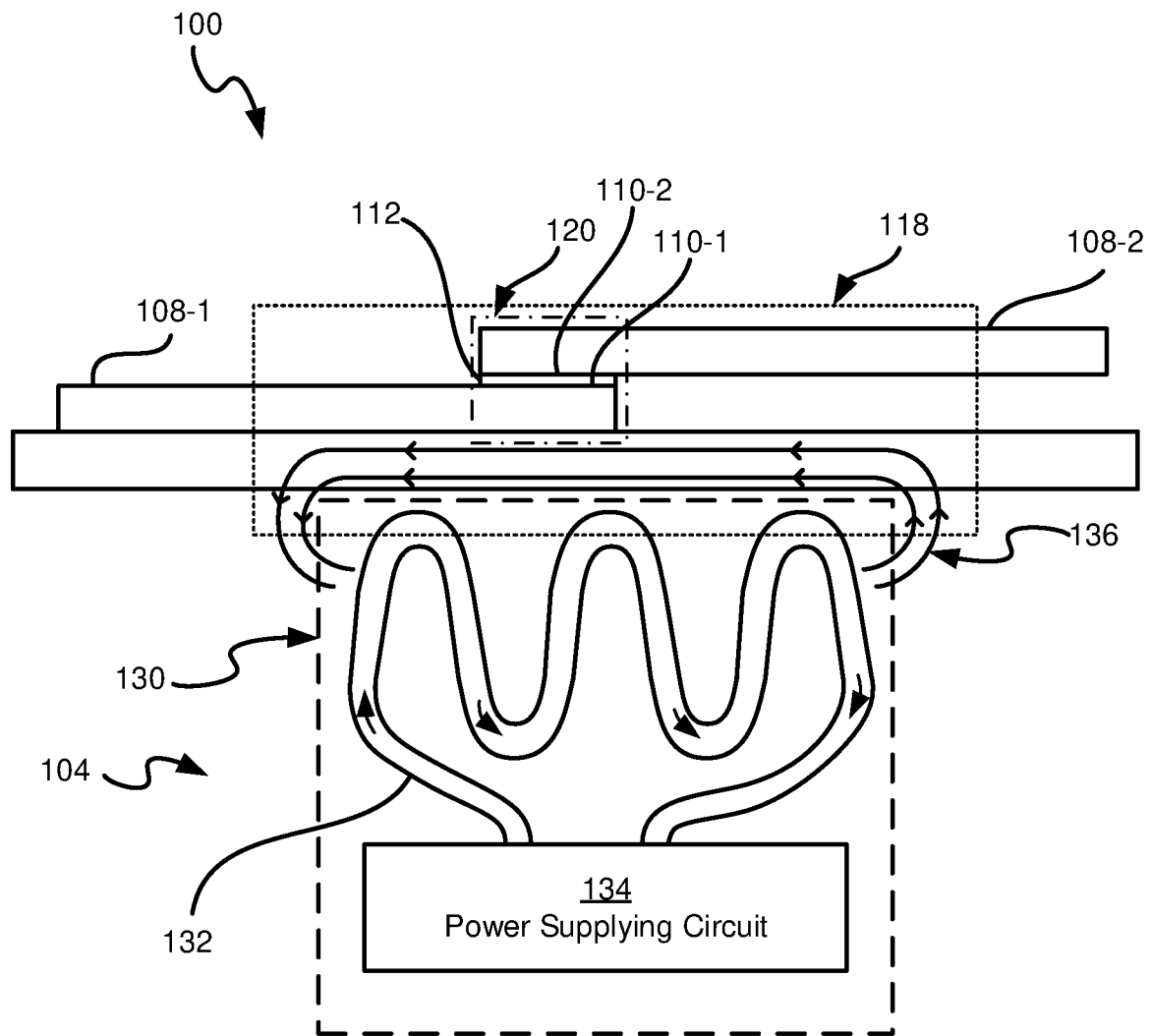
FIG. 1 depicts an induction-based system to join two substrates.

FIG. 1 depicts an example system 100 for joining two substrates according to the present disclosure. The system 100 includes an induction-based apparatus 104 (also referred to as simply the apparatus 104) for joining a first substrate 108-1 with a second substrate 108-2 (referred to collectively as the substrates 108 and generically as a substrate 108—this nomenclature may be used elsewhere herein). The substrates 108 can be plastics, metals, alloys, thermoplastics, composites, combinations of the above, and the like. In some examples, the substrates 108 may be dissimilar materials. For example, the first substrate 108-1 may include a metal material, while the second substrate 108-2 may include a plastic material.

The substrates 108 are to be joined together at a joint 120 defined by respective portions 110-1 and 110-2. The portions 110 may be end portions, such as to form a corner joint, or the portions 110 may be overlapping portions respective surfaces of the substrates 108. For example, in the present example, the portions 110 are substantially planar. In other examples, the portions 110 may be curved or otherwise non-planar and the portions 110 may conform to each other to form the joint 120.

The substrates 108 are joined together using a filler material 112. The filler material 112 includes an electrically conducting and/or magnetic material. In particular, the filler material 112 is applied between the respective portions 110 of the substrates 108. Together, the portions 110 and the filler material 112 define the joint 120. The joint 120 may be substantially planar, as in the present example, or the joint 120 may be otherwise shaped based on the portions 110 and their arrangement.

The filler material 112 includes an electrically conducting and/or magnetic material. For example, the filler material 112 can be a reactive metal compound such as a nano-thermite or a micro-thermite. In particular, the nano- or micro-thermite includes an oxidizer and a reducing agent (e.g., a metal and a metal oxide). The nano- or micro-thermites may be heated or energized via induction. Specifically, application of an alternating magnetic field induces eddy currents and/or hysteresis (as will be described in further detail below) in the nano- or micro-thermites, which in turn induces a reaction with core components, thereby releasing energy. More generally, the electrically conducting material can include various types of fluids (including liquids, gases, combinations, and the like) containing electrically conducting particles or components. The electrically conducting particles or components allow eddy currents and/or hysteresis to be introduced into the electrically conducting material to energize the electrically conducting material. For example, the electrically conducting material can include reactive metal compounds, compounds in gaseous state, in liquid state, in solid state, a slurry of materials involving multiple phases and states, synthetic and non-synthetic polymers, or the like. The electrically conducting material can further include a mixture of layers of materials, multi-coated metals with metamaterials, hybrid mixtures of reactive metal compounds in liquid and inert states, or other suitable combinations of materials. In some examples, the electrically conducting material may be a metallic or other suitable powder for a sintering operation, as will be described further below.

The apparatus 104 is generally configured to use induction-based techniques to join the substrates 108 together. The apparatus 104 therefore includes an induction heating assembly 130. The induction heating assembly 130 is generally configured to heat the joint 120 via induction. Specifically, the assembly 130 includes a coil 132 coupled to a power supplying circuit 134. The circuit 134 is configured to pass a current through the coil 132 for generating a magnetic field. The circuit 134 can be an electronic oscillator or other suitable circuitry for passing a high-frequency alternating current through the coil 132. Thus, an alternating magnetic field is induced in the coil 132. In some examples, the coil 132 may be oriented adjacent a joining region, for example, to allow large substrates 108 to be joined together. In other examples, the coil 132 may be configured to wrap around the joining region, such that the joining region is in the center of the coil to induce a stronger magnetic field in the joining region. In such examples, the size of the substrates 108 may be limited based on the size of the coil 132.

In operation, the power supplying circuit 134 is configured to pass a current through the coil 132, as indicated in FIG. 1 by arrows. In accordance with Ampere's Law, the current flowing through the coil 132 induces a magnetic field 136 around the coil 132. In some implementations, the power supplying circuit 134 is further configured to vary the current passing through the coil 132, thereby varying the magnetic field 136. In other implementations, the coil 132 may be configured to move relative to a joining region 118 to vary the magnetic field 136. For example, the coil 132 may be coupled to a positioning mechanism to move along a length of the joining region 118, which is stationary.

Figure 2:
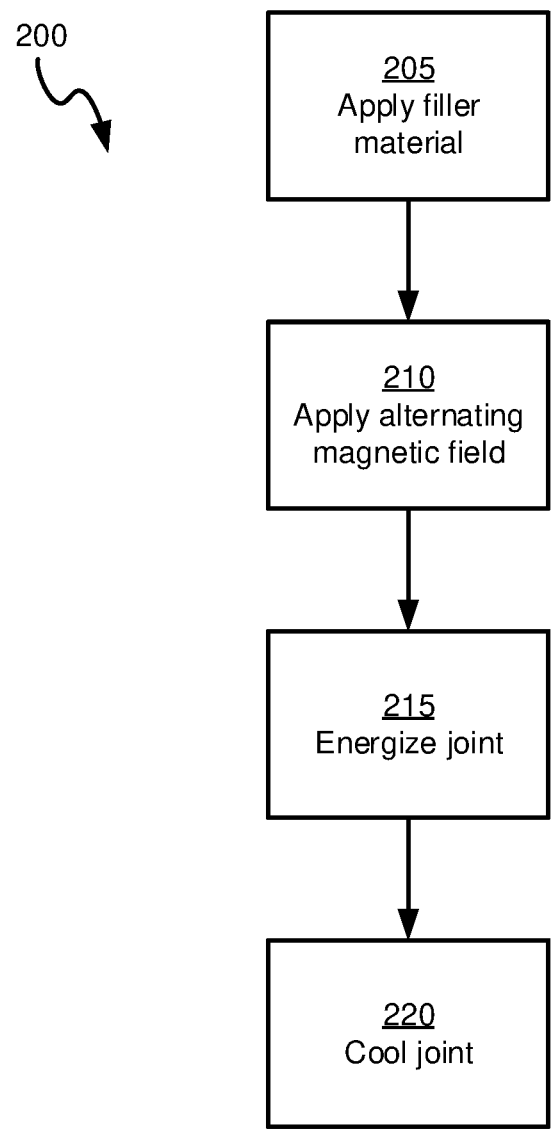
FIG. 2 depicts method of joining the two substrates in the system of FIG. 1.

The operation of the system 100 will now be described in conjunction with FIG. 2. FIG. 2 depicts a flowchart of a method 200 of joining two substrates. The method 200 will be described in conjunction with its performance in the system 100. In other examples, the method 200 may be performed by other suitable systems.

At block 205, a filler material is applied between respective portions 110 of the first substrate 108-1 and the second substrate 108-2. The filler material includes an electrically conducting material, such as a reactive metal compound (e.g. in liquid state or in gaseous state), a polymer, a thermoplastic, a multi-coated metal with metamaterials, or the like. In some examples, the filler material can include one or more further electrically conducting materials, such as a reactive metal compound (e.g. in liquid state or in gaseous state), a polymer, a thermoplastic, a multi-coated metal with metamaterials, or the like. The electrically conducting materials can include nanorods or nanowires (e.g. composed of gold, silver, copper, or the like), graphene or other suitable composites in addition to nano-thermites, metamaterials, and natural or synthetic polymers and thermoplastics.

More generally, the filler material 112 can include multiple electrically conducting and/or magnetic materials having different configurations (e.g. particle size, packing structure, such as simple cubic packing, face-centered cubic packing, hexagonal packing or the like), different structures (e.g. nanowires or rods, other particulate matter, liquids or the like), different reaction temperatures, different adhesion properties (e.g. better adhesion to different materials) or otherwise different energy release profiles.

The electrically conducting materials may be combined to form the filler material, for example in different layers, as a homogenous or heterogeneous mixture, or the like, according to the desired energy release profile. In particular, the variance in energy release profiles allows the apparatus 104 to precisely control the welding operation by controlling which materials are heated, and when they are heated.

For example, referring to FIGS. 3A-3D, example filler materials 300, 310, 320 and 330 are depicted.

The filler material 300 depicted in FIG. 3A includes a medium 302 and nano-thermites 304 (i.e., the electrically conducting material) dispersed throughout the medium 302. The medium 302 may be, for example, a metal, an alloy, a polymer, combinations of materials, or other suitable material for containing the nano-thermites 304. In some examples, the medium 302 may be substantially fluid to allow the nano-thermites 304 to be freely dispersed throughout the medium 302. In other examples, the medium 302 may be a gel or a solid to fix the positions of the nano-thermites 304 in the medium 302.

The filler material 310 depicted in FIG. 3B includes a medium 312, first nano-thermites 314 and second nano-thermites 316. Similarly to the filler material 300, the first nano-thermites 314 and second nano-thermites 316 are dispersed throughout the medium 312. The medium 312 may be a metal, a polymer, combinations of materials, or other suitable materials for containing the nano-thermites 314 and 316. In some examples, the medium 312 may be fluid to allow the nano-thermites 314 and 316 to be freely dispersed throughout the medium 312. In other examples, the medium 312 may be a gel or a solid to fix the positions of the nano-thermites 314 and 316 in the medium 312. In the present example, the nano-thermites 314 and 316 are evenly distributed throughout the medium 312.

In other examples, such as in the filler material 320 depicted in FIG. 3C, first nano-thermites 324 and second nano-thermites 326 may be separated. Specifically, medium 322 may fix the first nano-thermites 324 at a first surface of the filler material 320 and the second nano-thermites 326 at a second surface of the filler material 320. In such examples, the medium 322 may be a gel or a solid to allow separation of the nano-thermites 324 and 326.

In still further examples, the filler material may not include a medium throughout which the electrically conducting material is dispersed. For example, the filler material 330 depicted in FIG. 3D includes first nano-thermites 334 and second nano-thermites 336 intermixed with each other, but not contained by a medium. For example, the nano-thermites 334 and 336 may form a powder for sintering operations. In other examples, the filler material 330 may contain a single type of nano-thermite (e.g., only the first nano-thermites 334 or only the second nano-thermites 336). The first nano-thermite and second nano-thermite may be heated to form an alloy.

Returning to FIG. 2, at block 205, the filler material may be selected according to the type of joining operation. For example, for a sintering operation, the filler material 330 may be utilized, while for a soldering operation, the filler material 300 may be utilized. To weld together two dissimilar materials, the filler material 320 may be utilized. The filler material may further be selected according to the energy release profile of the one or more electrically conducting materials contained therein. For example, to join two substrates which utilize relatively higher temperatures to join, the filler material 310 may be utilized to allow the first nano-thermites 314 to be heated with lower input energy, and to create a chain reaction to energize the second nano-thermites 316 to achieve the temperatures for joining the two substrates.

Figure 4:
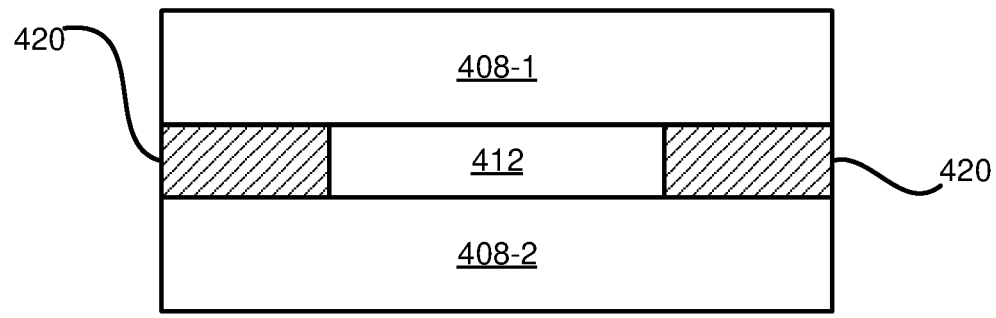
FIG. 4 depicts two substrates with a magnetic insulator.

In some examples, at block 205, a magnetic insulator may be applied at the joint to restrict the application of the filler material 112 to certain regions. For example, referring to FIG. 4, a filler material 412 is applied between two substrates 408-1 and 408-2 and restricted by a magnetic insulator 420.

Returning to FIG. 2, at block 210, the alternating magnetic field 136 is applied to the joint 120 to heat the electrically conducting and/or magnetic material to a reaction temperature. In particular, applying the alternating magnetic field 136 can include applying an alternating current to the coil 132 by the power supplying circuit 134 to induce a magnetic field.

In accordance with Faraday's Law of Induction, the varying magnetic field 136 induces eddy currents in nearby conductors, and in particular, in the electrically conducting material of the filler material. The induction of eddy currents in the electrically conducting material energizes the electrically conducting material and heats it to its reaction temperature. In some examples, the electrically conducting material may be energized via magnetic hysteresis. In particular, the magnetizing force against the internal friction of the molecules of the magnet produces heat energy. The energy lost due to heat is hysteresis loss. When magnetic force is applied, the molecules of the magnetic material of the filler material 112 are aligned in a first direction. When the magnetic force is reversed, the internal friction of the molecules of the magnetic material opposes the reversal of magnetism, resulting in magnetic hysteresis, and hence heating of the magnetic material. In some examples, at block 210, the method 200 may employ both magnetic hysteresis and induction heating via eddy currents to energize the electrically conducting and/or magnetic material for the joining operation.

In examples where a magnetic insulator is applied, heating may be restricted to regions of the filler material which are not blocked by the insulator. Thus, application of the magnetic insulator may provide greater control over the joining operation and the regions which are joined together.

At block 215, upon reaching its reaction temperature, the electrically conducting material releases energy according to its energy release profile and energize the joint. That is, in response to heating the electrically conducting material to the reaction temperature, the joint may be energized using energy released from the electrically conducting material. In particular, upon reaching its reaction temperature, the electrically conducting material may undergo an exothermic reaction and release energy to energize one or more of the filler material and the portions 110.

Figure 5:
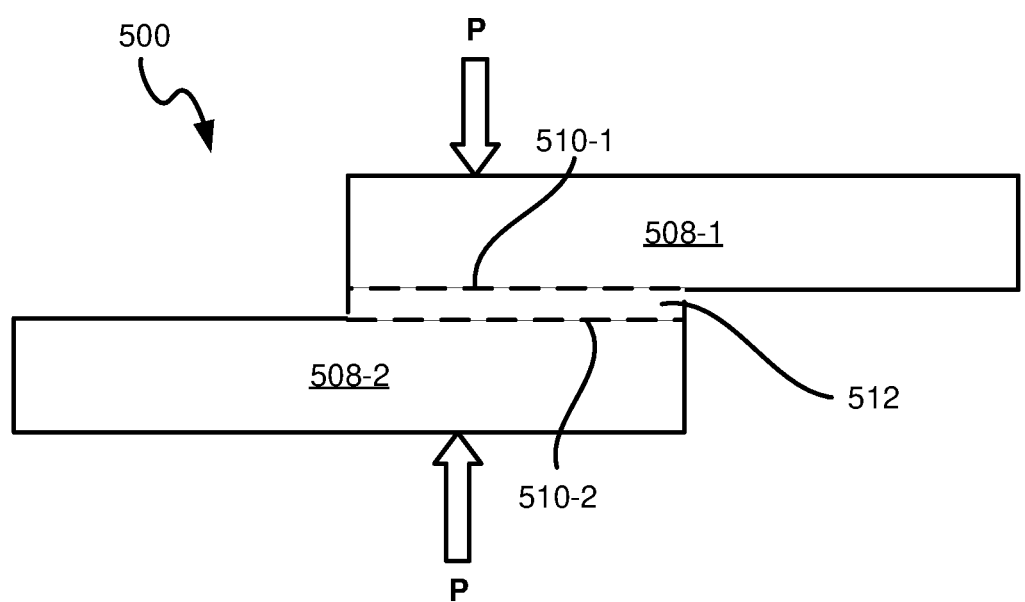
FIG. 5 depicts an example sintering operation in the system of FIG. 1.

For example, referring to FIG. 5, a sintering operation 500 is depicted. In particular, energizing the joint may include energizing respective portions of the first and second substrates without liquefaction to sinter the first substrate with the second substrate. In the sintering operation 500, a filler material 512 including an electrically conducting material is applied in between a first substrate 508-1 and a second substrate 508-2. Specifically, the filler material 512 contacts a first surface 510-1 of the first substrate 508-1 and a second surface 510-2 of the second substrate 508-2. When the electrically conducting material is heated to its reaction temperature, the filler material 512, the first surface 510-1 and the second surface 510-2 are heated without melting to the point of liquefaction. The filler material 512 fuses with the first surface 510-1 and the second surface 510-2, thus sintering the first substrate 508-1 with the second substrate 508-2. For example, the filler material 512 may include a metallic powder, such as the filler material 330 to allow for a compact sintering operation 500. In some examples, the sintering operation 500 may further include applying pressure to the joint, for example, as depicted by the arrows P in FIG. 5, to support and assist the sintering of the first substrate 508-1 with the second substrate 508-2.

In some implementations, the filler material can be energized for sintering processes by heat and/or pressure-less or pre-assisted techniques, Through the control of densification and/or grain growth, substrates can fuse and form a weld and/or mold to create different shapes and enhance material properties such as strength, electrical and thermal conductivity, and translucency or the like.

Figure 6:
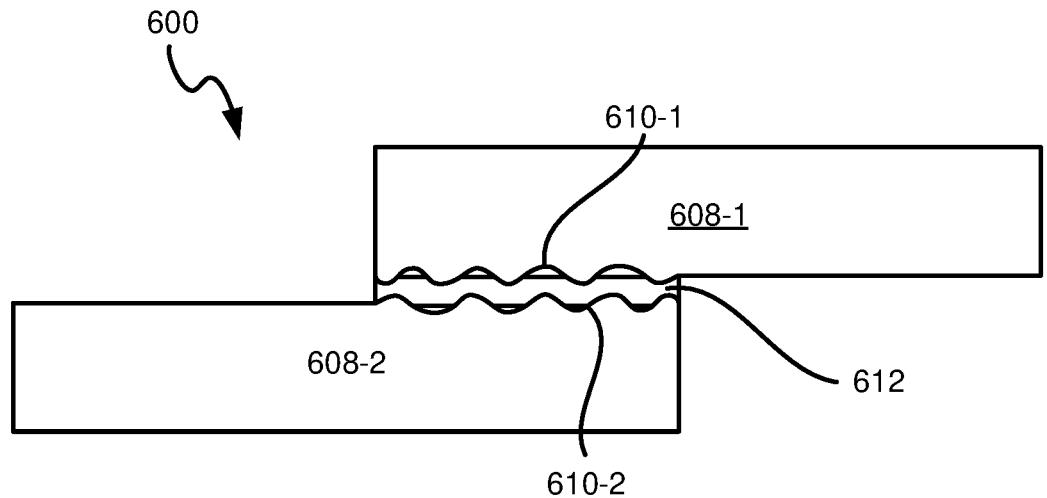
FIG. 6 depicts an example welding operation in the system of FIG. 1.

Referring now to FIG. 6, a welding operation 600 is depicted. In particular, energizing the joint may include melting respective surfaces of the respective portions of the first and second substrates to weld the first substrate with the second substrate. In the welding operation 600, a filler material 612 including an electrically conducting material is applied in between a first substrate 608-1 and a second substrate 608-2. Specifically, the filler material 612 contacts a first surface 610-1 of the first substrate 608-1 and a second surface 610-2 of the second substrate 608-2. When the electrically conducting material is heated to its reaction temperature, the first surface 610-1 and the second surface 610-2 are melted and may be welded together upon cooling. For example, the welding operation 600 may utilize the filler material 300.

Figure 7:
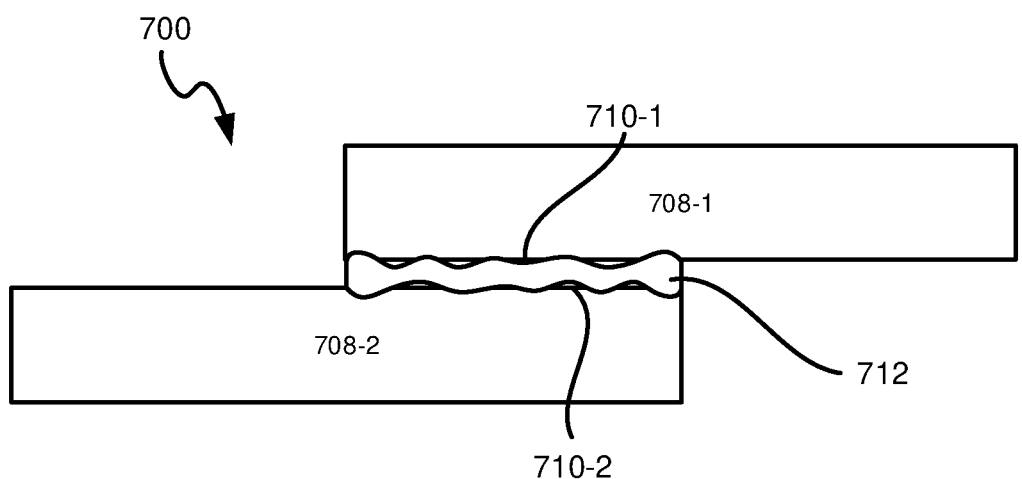
FIG. 7 depicts an example soldering operation in the system of FIG. 1.

Referring now to FIG. 7, a soldering operation 700 is depicted. In particular, energizing the joint may include energizing a soldering portion of the filler material to solder the first substrate with the second substrate. In the soldering operation 700, a filler material 712 including an electrically conducting material is applied in between a first substrate 708-1 and a second substrate 708-2. Specifically, the filler material 712 contacts a first surface 710-1 of the first substrate 708-1 and a second surface 710-2 of the second substrate 708-2. When the electrically conducting material is heated to its reaction temperature, the filler material 712, and in particular, a dispersion medium in which the electrically conducting material is dispersed may be melted to solder together the first substrate 708-1 and the second substrate 708-2. That is, the filler material, and in particular, the dispersion medium may act to join the first and second substrates 708.

In still further examples, energizing the joint may include heating a further electrically conductive material to a further reaction temperature. That is, the energy released upon the first electrically conducting material may initiate a chain reaction to heat additional electrically conductive materials to their respective reaction temperatures. For example, a first electrically conductive material may have a relatively lower reaction temperature, while a second electrically conductive material may have a relatively higher reaction temperature. The electrically conductive materials may be heated to the reaction temperature of the first electrically conductive material, which may undergo an exothermic reaction and thus release energy. The energy released may further energize the second electrically conductive material to allow it to reach its relatively higher reaction temperature. The second electrically conductive material may release additional energy. The additional energy may be used to continue a chain reaction of electrically conductive materials, or it may energize other components of the joint. That is, the additional energy released from the second material may be utilized in the sintering operation 500, the welding operation 600 or the soldering operation 700 in addition to or instead of the energy released from the first electrically conducting material. Such chain reactions may be utilized, for example, to join substrates including materials which are to be joined at relatively high temperatures with lower input requirements.

In other examples, two different electrically conducting materials may be used to join two dissimilar substrates. For example, upon reaching the first reaction temperature of the first electrically conducting material, the first substrate may be bonded to the filler material, and upon reaching the second reaction temperature of the second electrically conducting material, the second substrate may be bonded to the filler material. That is, the joining of the first substrate with the second substrate may be a two-stage process, wherein one of the substrates is bonded to the filler material in the interim.

In still further examples, rather than using the energy from the first electrically conducting material to heat the second electrically conducting material, blocks 210 and 215 may be repeated to heat the second electrically conducting material to its reaction temperature. Specifically, the strength of the magnetic field 136 may be controlled (e.g., by controlling the current supplied to the coil 132 by the circuit 134) to specifically heat the first electrically conducting material to the first reaction temperature and then changing the magnetic field 136 to heat the second electrically conducing material to the second reaction temperature.

In some examples, at blocks 210 and 215, a secondary technique may be employed to further join the first substrate with the second substrate. The secondary technique may be performed simultaneously or sequentially with the blocks 210 and 215. Example secondary techniques include, but are not limited to: solid-state bonding (e.g. anodic/wafer joining, diffusion bonding, ultrasonic wire bonding, cold bonding, explosive bonding, friction-stir bonding, friction welding, or the like), soldering/brazing (e.g. furnace, laser reflow, resistance, dip, wave, active brazing, flip chip bonding, or the like), fusion welding (e.g. laser beam, electron beam, percussive, plasma, gas tungsten, resistance, glass sealing, or the like), adhesive bonding (e.g. die attachment, flip chip bonding, sealing, or the like), and combinations of the above. Additionally, the method 200 may further include applying pressure to the joint simultaneously or sequentially with applying the alternating magnetic field to the joint at block 210.

At block 220, the joint is cooled to join the first substrate 108-1 with the second substrate 108-2. Specifically, upon cooling of the joint, the first and second substrates 108 may be joined or bonded into a single final product.

Thus, the method 200 provides an induction-based technique for joining two substrates. The induction-based technique may be combined with other welding and/or bonding techniques to form a hybrid system. The induction-based technique may be used on earth (e.g. on land, air or water applications), in space (e.g. celestial bodies, the Moon, Mars, other planets, moons, asteroids, planetoids, and other celestial bodies or the like). In some examples, the induction-based technique may employ in-situ space resources, such as regolith on the Moon, Mars, materials on other planets, moons, asteroids, planetoids, and other celestial bodies, or the like to supplement the filler material. Further, the induction welding technique localizes energy generation and molten materials in space-limited situations for microjoining applications.

For example, titanium powder (Ti) may be mixed with Boron (B) or Carbon (C) to form the filler material and pressed between Molybdenum (Mo) surfaces and ignited to form Mo—$TiB_2$—Mo or Mo—TiC—Mo welds. In other examples, Aluminum (Al), Nickel (Ni), and Copper (Cu) mixtures may also be used as a filler material. Furthermore, combinations of metals and metal oxides may be used as filler material to join substrates, and the filler material may be composed of powdered, layered, laminated, and core-shell composites.

Figure 8:
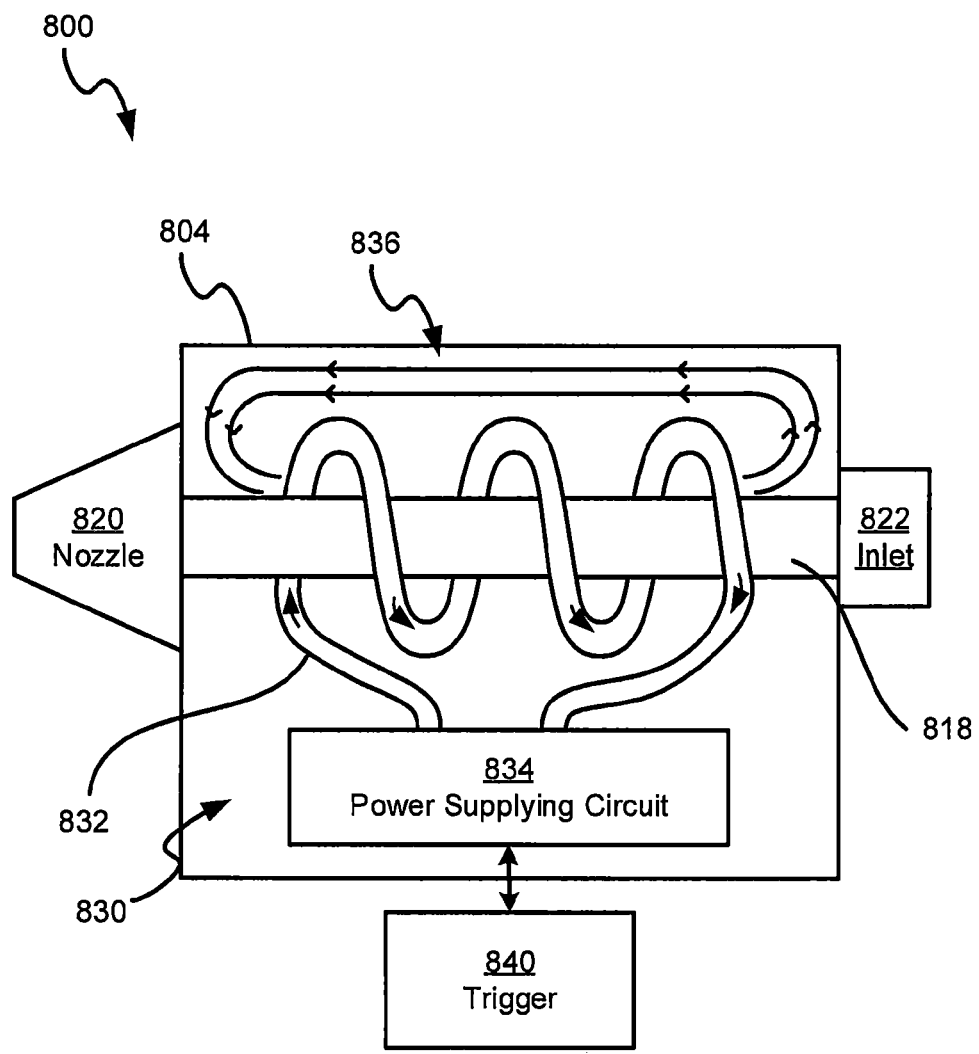
FIG. 8 depicts an example apparatus for induction-based joining.

Referring now to FIG. 8, an example induction-based apparatus 800 for joining substrates is depicted. The apparatus 800 includes a housing 804 to house an induction heating assembly 830, a nozzle 820 and an inlet 822. In other implementations, the coils in the induction heating assembly 830 may also be configured around the nozzle 820.

The induction heating assembly 830 is housed in the housing 804 and includes a coil 832 coupled to a power supplying circuit 834. The circuit is configured to pass a current through the coil 832 for generating a magnetic field. The circuit 834 can be an electronic oscillator or other suitable circuitry for passing a high-frequency alternating current through the coil 832. Thus, an alternating magnetic field is induced in the coil 832. The coil 832 is configured to wrap around a heating region 818 such that the heating region 818 is in the center of the coil 832 to induce a stronger magnetic field in the heating region 818. The induction heating assembly 830 may be coupled to a trigger 840 to control the actuation of the induction heating assembly 830. In operation, the power supplying circuit 834 is configured to pass a current through the coil 832, as indicated by arrows. In accordance with Ampere's Law, the current flowing through the coil 832 induces a magnetic field 136 around the coil 832. In some implementations the power supplying circuit 834 is further configured to vary the current passing through the coil 832, thereby varying the magnetic field 836. In other implementations, the coil 832 may be configured to move relative to a heating region 818 to vary the magnetic field 836. For example, the coil 832 may be coupled to a positioning mechanism to move along a length of the heating region 818, which is stationary. Specifically, application of an alternating magnetic field induces eddy currents and/or hysteresis (as will be described in further detail below) in the nano- or micro-thermites, which in turn induces a reaction with core components, thereby releasing energy.

The heating region 818 is coupled to the inlet 822 to receive materials therefrom, and to the nozzle 820 to expel heated materials from the apparatus 800. Specifically, a filler material is fed through the inlet 822, is heated by the induction heating assembly 830 in the heating region 818. The filler material may include a dispersion medium and an electrically conducting material dispersed throughout the dispersion medium. The electrically conducting material can be a reactive metal compound such as a nano-thermite or a micro-thermite, and the dispersion medium may be a gel or solid to hold the filler material together to allow it to be fed into the apparatus 800. Thus, the induction heating assembly 830 may energize the filler material from a solid or gel state to an energized fluid or plasma state to be expelled from the nozzle 820. The energized fluid or plasma may be applied between two substrates to join the two substrates together.

The present disclosure provides systems and methods for joining two substrates using an induction-based technique, whereby a filler material including an electrically conducting material is energized via induction heating. The two substrates may be dissimilar materials. The induction welding technique can use a slurry of nano-energetic composites, metamaterials and polymers, or reactive metal compounds as the filler material. The properties of the filler material may be selected to control the energy release profile. Further, the use of induction ignition and/or heating allows for a consistent heating across the joint. The joint is therefore not limited to a linear weld or joint, and can be a substantially planar formation.

The scope of the claims should not be limited by the embodiments set forth in the above examples, but should be given the broadest interpretation consistent with the description as a whole.

The invention claimed is:

1. A method of joining a first substrate with a second substrate, the method comprising:
applying a filler material including electrically conducting material or magnetic material between respective portions of the first substrate and the second substrate defining a joint, the electrically conducting material or magnetic material including at least a first material of a reactive metal compound having a first reaction temperature and a second material of the reactive metal compound having a second reaction temperature, wherein the second reaction temperature is higher than the first reaction temperature, wherein the second material is interspersed with the first material;
applying an alternating magnetic field to the joint to heat the first material and the second material of the reactive metal compound to the first reaction temperature;
heating the second material to the second reaction temperature with an energy released by the first material and the second material of the reactive metal compound when the first material and the second material are undergoing an exothermic reaction upon reaching the first reaction temperature;
energizing the joint using an energy released from the second material upon reaching the second reaction; and
cooling the joint to join the first substrate with the second substrate.

2. The method of claim 1, wherein energizing the joint comprises energizing respective surfaces of the respective portions of the first and second substrates without liquefaction to sinter the first substrate with the second substrate.

3. The method of claim 2, further comprising applying pressure to the joint to support the sintering of the first substrate with the second substrate.

4. The method of claim 1, wherein energizing the joint comprises melting respective surfaces of the respective portions of the first and second substrates to weld the first substrate with the second substrate.

5. The method of claim 1, wherein energizing the joint comprises energizing a soldering portion of the filler material to solder the first substrate with the second substrate.

6. The method of claim 1, wherein the first material comprises at least one of: nanothermites, microthermites, and metamaterials.

7. The method of claim 1, wherein energizing the joint comprises one of:
energizing respective surfaces of the respective portions of the first and second substrates without liquefaction to sinter the first substrate with the second substrate;
melting respective surfaces of the respective portions of the first and second substrates to weld the first substrate with the second substrate; and
energizing a soldering portion of the filler material to solder the first substrate with the second substrate.

8. The method of claim 1, wherein heating the electrically conducting material or magnetic material to a reaction temperature comprises one of:
inducing eddy currents in the electrically conducting material or magnetic material; and
inducing magnetic hysteresis in the electrically conducting material or magnetic material.

9. The method of claim 1, further comprising applying a magnetic insulator at the joint to restrict a region joined by the filler material.

10. The method of claim 1, wherein joining the first substrate and the second substrate further comprises at least one of: solid-state bonding, brazing, fusion welding, adhesive bonding, and combinations thereof.

11. The method of claim 1, further comprising applying pressure to the joint simultaneously with applying the alternating magnetic field.

12. The method of claim 1, wherein the joint is substantially planar.

13. The method of claim 1, wherein the first substrate and the second substrate comprise dissimilar materials.

14. An induction-based apparatus to join substrates, the apparatus comprising:
a housing;
an inlet to receive a filler material including an electrically conducting material or magnetic material comprising a first material of a reactive metal compound having a first reaction temperature and a second material of the reactive metal compound having a second reaction temperature, wherein the second reaction temperature is higher than the first reaction temperature;
an induction heating assembly including a coil that is housed in the housing configured to:
receive the filler material from the inlet; and
apply an alternating magnetic field to inductively energize the first material and the second material to reach the first reaction temperature; and
a nozzle to expel the energized filler material for joining the first substrate and second substrate, wherein upon deposit of the energized filler material onto the first substrate and second substrate, the second material is heated to the second reaction temperature with an energy released by the first material and the second material when the first material and the second material are undergoing an exothermic reaction upon reaching the first reaction temperature, and the first substrate and the second substrate are joined together with an energy released from the second material when the second material is reaching the second reaction temperature.

15. The method of claim 1, wherein the second material comprises at least one of: nanothermites, microthermites, and metamaterials.

16. The method of claim 1, wherein the first and the second substrate are energized to undergo a phase change.

* * * * *